US011199390B2

(12) United States Patent
Khangar et al.

(10) Patent No.: US 11,199,390 B2
(45) Date of Patent: Dec. 14, 2021

(54) TAPE MEASURE WITH REINFORCED TAPE BLADE

(71) Applicant: Milwaukee Electric Tool Corporation, Brookfield, WI (US)

(72) Inventors: Abhijeet A. Khangar, Pewaukee, WI (US); Jacob Feuerstein, Del Mar, CA (US); Patrick W. McCarthy, Milwaukee, WI (US); Collin D. Roesser, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 256 days.

(21) Appl. No.: 16/360,894

(22) Filed: Mar. 21, 2019

(65) Prior Publication Data

US 2019/0277612 A1 Sep. 12, 2019

Related U.S. Application Data

(63) Continuation of application No. PCT/US2019/021012, filed on Mar. 6, 2019.

(60) Provisional application No. 62/639,743, filed on Mar. 7, 2018.

(51) Int. Cl.
  *G01B 3/1003* (2020.01)
  *G01B 3/1041* (2020.01)
  *G01B 1/00* (2006.01)
  G01B 3/1046 (2020.01)

(52) U.S. Cl.
  CPC ............. *G01B 3/1003* (2020.01); *G01B 1/00* (2013.01); *G01B 3/1041* (2013.01); G01B 3/1046 (2020.01)

(58) Field of Classification Search
  CPC ...... G01B 3/1003; G01B 1/00; G01B 3/1041; G01B 3/1046
  USPC .......................................................... 33/759
  See application file for complete search history.

(56) References Cited

U.S. PATENT DOCUMENTS

| 2,089,209 | A | 8/1937 | Keuffel et al. |
| 2,303,368 | A | 12/1942 | Keuffel et al. |
| 2,471,395 | A | 5/1949 | Keuffel |
| RE23,133 | E | 7/1949 | Kueffel et al. |
| 2,814,881 | A | 12/1957 | Ljungberg |
| 3,121,957 | A | 2/1964 | Brown |
| 3,214,836 | A | 11/1965 | West |

(Continued)

FOREIGN PATENT DOCUMENTS

| CN | 2705772 | 6/2005 |
| CN | 202066436 | 12/2011 |

(Continued)

OTHER PUBLICATIONS

U.S. Appl. No. 62/639,743, filed Mar. 7, 2018, Khangar et al.

(Continued)

*Primary Examiner* — Yaritza Guadalupe-McCall
(74) *Attorney, Agent, or Firm* — Reinhart Boerner Van Deuren s.c.

(57) ABSTRACT

A tape measure including a reinforced or coated tape measure blade is provided. The reinforcement layer is thicker than the metal inner layer of the tape blade. The reinforcement layer provides a reinforced tape blade such that the elongate tape blade may have a pinch load threshold of greater than 30 lbs. and/or a pinch height at break of less than 1.5 mm.

21 Claims, 6 Drawing Sheets

(56) References Cited

U.S. PATENT DOCUMENTS

| | | | |
|---|---|---|---|
| 3,330,709 | A | 7/1967 | Zelnick |
| 3,409,988 | A | 11/1968 | Zelnick |
| 3,439,428 | A | 4/1969 | Zelnick |
| 3,450,367 | A | 6/1969 | Edgell |
| 3,889,897 | A | 6/1975 | Van Zelderen |
| 3,942,738 | A | 3/1976 | Rutty |
| 4,198,458 | A | 4/1980 | Mitsuishi et al. |
| 4,286,387 | A | 9/1981 | Di Diego |
| 4,531,688 | A | 7/1985 | Gall |
| 4,835,870 | A | 6/1989 | Rauch et al. |
| 4,926,566 | A | 5/1990 | McMurtry et al. |
| 5,471,761 | A | 12/1995 | Cheng |
| 5,738,743 | A | 4/1998 | Lee |
| 5,820,057 | A | 10/1998 | Decarolis et al. |
| 5,895,539 | A | 4/1999 | Hsu |
| 5,979,238 | A | 11/1999 | Boege et al. |
| 6,115,933 | A | 9/2000 | Li |
| 6,148,534 | A | 11/2000 | Li |
| 6,243,964 | B1 | 6/2001 | Murray |
| 6,249,986 | B1 | 6/2001 | Murray |
| 6,282,808 | B1 | 9/2001 | Murray |
| 6,324,769 | B1 | 12/2001 | Murray |
| 6,440,502 | B1 | 8/2002 | Lee |
| 6,449,866 | B1 | 9/2002 | Murray |
| 6,499,226 | B1 | 12/2002 | Reda |
| 6,637,124 | B2 | 10/2003 | Pederson |
| 6,643,947 | B2 | 11/2003 | Murray |
| 6,804,899 | B2 | 10/2004 | Murray |
| 6,907,676 | B2 | 6/2005 | Liao |
| 7,398,604 | B2 | 7/2008 | Murray |
| 7,565,751 | B2 | 7/2009 | Murray |
| 7,856,735 | B2 | 12/2010 | Allezy et al. |
| 8,117,762 | B2 | 2/2012 | Delneo et al. |
| 8,117,763 | B2 | 2/2012 | Delneo et al. |
| 8,356,418 | B1 | 1/2013 | Hall |
| 8,584,373 | B2 | 11/2013 | Murray et al. |
| 9,874,428 | B1 | 1/2018 | Nelson et al. |
| 10,126,107 | B2 * | 11/2018 | Khangar ............... G01B 3/1003 |
| 10,746,521 | B2 * | 8/2020 | Khangar ............... G01B 3/1003 |
| 2001/0053436 | A1 | 12/2001 | Li |
| 2002/0073570 | A1 | 6/2002 | Conder |
| 2002/0129509 | A1 | 9/2002 | Evans |
| 2004/0071869 | A1 | 4/2004 | Gilliam et al. |
| 2006/0053649 | A1 | 3/2006 | Greally |
| 2006/0059703 | A1 | 3/2006 | Hernandez |
| 2006/0130352 | A1 | 6/2006 | Huang |
| 2007/0074417 | A1 | 4/2007 | Sun |
| 2007/0079520 | A1 | 4/2007 | Hamilton et al. |
| 2009/0090016 | A1 | 4/2009 | Roach |
| 2011/0232119 | A1 | 9/2011 | Smalls |
| 2012/0036727 | A1 | 2/2012 | McCarthy |
| 2013/0067759 | A1 | 3/2013 | Murray et al. |
| 2015/0247716 | A1 | 9/2015 | Craig et al. |
| 2018/0195847 | A1 * | 7/2018 | Khangar ............... G01B 3/1003 |
| 2019/0056208 | A1 * | 2/2019 | Khangar ................ G01B 1/00 |
| 2019/0242686 | A1 * | 8/2019 | Reddy ................ C07D 241/44 |
| 2019/0277612 | A1 * | 9/2019 | Khangar ............... G01B 3/1041 |
| 2020/0370874 | A1 * | 11/2020 | Khangar ............... G01B 3/1056 |
| 2021/0072010 | A1 * | 3/2021 | Khangar ............... G01B 3/1007 |

FOREIGN PATENT DOCUMENTS

| | | |
|---|---|---|
| CN | 202432942 | 9/2012 |
| CN | 202757538 | 2/2013 |
| CN | 204612629 | 9/2015 |
| CN | 205482653 | 8/2016 |
| DE | 19628318 | 3/1998 |
| EP | 0100138 | 2/1984 |
| EP | 1411319 | 4/2004 |
| EP | 1444479 | 8/2004 |
| EP | 1647797 | 6/2012 |
| EP | 2400258 | 11/2014 |
| JP | 06-213602 | 8/1994 |
| WO | WO02057710 | 7/2002 |
| WO | WO03031903 | 4/2003 |
| WO | WO2004063659 | 7/2004 |
| WO | WO17172683 | 10/2017 |
| WO | WO2018048810 | 3/2018 |

OTHER PUBLICATIONS

International Search Report and Written Opinion for International Application No. PCT/US2019/021012, dated Jun. 19, 2019, 15 pages.

DeWalt, 16 FT Tape Measure—DWHT364105 Brochure, <https://www.dewalt.com/en-us/products/hand-tools/measuring-and-layout-tools/16-ft-tape-measure/dwht36105>, a commercially available tape measure including a tape measure blade believed to be representative of a tape measure blade commercially available before Sep. 8, 2016, 5 pages.

Stanley, 16 ft FATMAX Tape Measure—33-716 Brochure, <https://www.stanleytools.com/en-us/products/hand-tools/measuring-layout/fatmax-tape-measure/16-ft-fatmax-tape-measure/33-716>, a commercially available tape measure including a tape measure blade believed to be representative of a tape measure blade commercially available before Sep. 8, 2016, 6 pages.

DeWalt, 16' X 1-1/4" Premium Tape—DWHT33924 Brochure, <https://www.dewalt.com/en-us/product-repository/products-dewalt/2016/04/13/16/16/dwht33924>, a commercially available tape measure including a tape measure blade believed to be representative of a tape measure blade commercially available before Sep. 8, 2016, 5 pages.

Milwaukee, 16ft Magnetic Tape Measure—48-22-7116 Brochure, <https://www.milwaukeetool.com/Products/Hand-Tools/Measuring/Short-Tape-Measures-48-22-7116>, a commercially available tape measure representative of a tape measure blade commercially available before Sep. 8, 2016, 3 pages.

European Patent Office, Extended European Search Report for EP counterpart application, dated Oct. 8, 2021, 10 pages, Munich Germany.

* cited by examiner

TAPE MEASURE WITH REINFORCED TAPE BLADE

CROSS-REFERENCE TO RELATED PATENT APPLICATION

The present application is a continuation of International Application No. PCT/US2019/021012, filed on Mar. 6, 2019, which claims the benefit of and priority to 62/639,743, filed on Mar. 7, 2018, which are incorporated herein by reference in their entireties.

BACKGROUND OF THE INVENTION

The present invention relates generally to the field of tools. The present invention relates specifically to a tape measure, measuring tape, retractable rule, etc., that includes a tape measure blade with a reinforcing layer on the tape blade.

Tape measures are measurement tools used for a variety of measurement applications, including in the building and construction trades. Some tape measures include a graduated, marked blade wound on a reel and also include a retraction system for automatically retracting the blade onto the reel. In some such tape measure designs, the retraction system is driven by a coil or spiral spring that is tensioned, storing energy as the tape is extended, and that releases energy to spin the reel, winding the blade back onto the reel such that automatic or non-manual tape retraction is provided. In some other tape measure designs, retraction of the tape is controlled via a manual crank, and such tape measure blades tend to have a long length.

SUMMARY OF THE INVENTION

This application relates to various tape measure embodiments discussed herein.

In one embodiment, a tape measure is provided. The tape measure includes a housing, a reel rotatably mounted within the housing and an elongate blade wound around the reel. The elongate blade includes an elongate metal core having an upper surface, a lower surface and a first thickness, T1, measured between the upper surface and the lower surface, and the upper surface includes a concave curved section and the lower surface includes a convex curved section. The elongate blade includes an upper reinforcement layer coupled to and covering at least a portion of the upper surface of the elongate metal core, and the upper reinforcement layer includes a second thickness, T2, and an upper surface defining the uppermost surface of the elongate blade. The elongate blade includes a lower reinforcement layer coupled to and covering at least a portion of the lower surface of the elongate metal core, and the lower reinforcement layer has a third thickness, T3, and a lower surface defining the lowermost surface of the elongate blade. The elongate blade includes an ink layer located between the upper surface of the elongate metal core and the upper reinforcement layer forming a series of measurement markings. The thicknesses are such that T2+T3≥T1, and he elongate blade has a pinch load threshold of greater than 30 lbs. The tape measure includes a retraction mechanism coupled to the reel and configured to driving rewinding of the elongate blade on to the reel. The tape measure includes a hook assembly coupled to an outer end of the elongate blade.

In another embodiment, a tape measure is provided. A tape measure including a housing, a reel rotatably mounted within the housing and an elongate blade wound around the reel. The elongate blade includes an elongate metal core having an upper surface, a lower surface and a metal thickness measured between the upper surface and the lower surface. The elongate blade includes polymer reinforcement layer coupled to a surface of the elongate metal and extending contiguously lengthwise for at least 6 ft. along a length of the elongate metal core, and the polymer reinforcement layer has a polymer reinforcement layer thickness. The elongate blade includes an ink layer located between the elongate metal core and the polymer reinforcement layer, and the ink layer forms a series of measurement markings. The elongate blade has a pinch load threshold of greater than 30 lbs. The tape measure includes a retraction mechanism coupled to the reel and configured to driving rewinding of the elongate blade on to the reel, and a hook assembly coupled to an outer end of the elongate blade.

In another embodiment, a tape measure is provided. The tape measure includes a housing, a reel rotatably mounted within the housing and an elongate blade wound around the reel. The elongate blade includes an elongate metal core having an upper surface, a lower surface and a metal thickness measured between the upper surface and the lower surface. The elongate blade includes a polymer reinforcement layer at least partially surrounding the elongate metal core when viewed in cross-section and extending contiguously lengthwise for at least 6 ft. along a length of the elongate metal core, and the polymer reinforcement layer has a polymer reinforcement layer thickness. The elongate blade includes an ink layer located between the elongate metal core and the polymer reinforcement layer, and the ink layer forms a series of measurement markings. The polymer reinforcement layer thickness is greater than the metal thickness. The tape measure including a retraction mechanism coupled to the reel and configured to driving rewinding of the elongate blade on to the reel and a hook assembly coupled to an outer end of the elongate blade.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Figure 1:
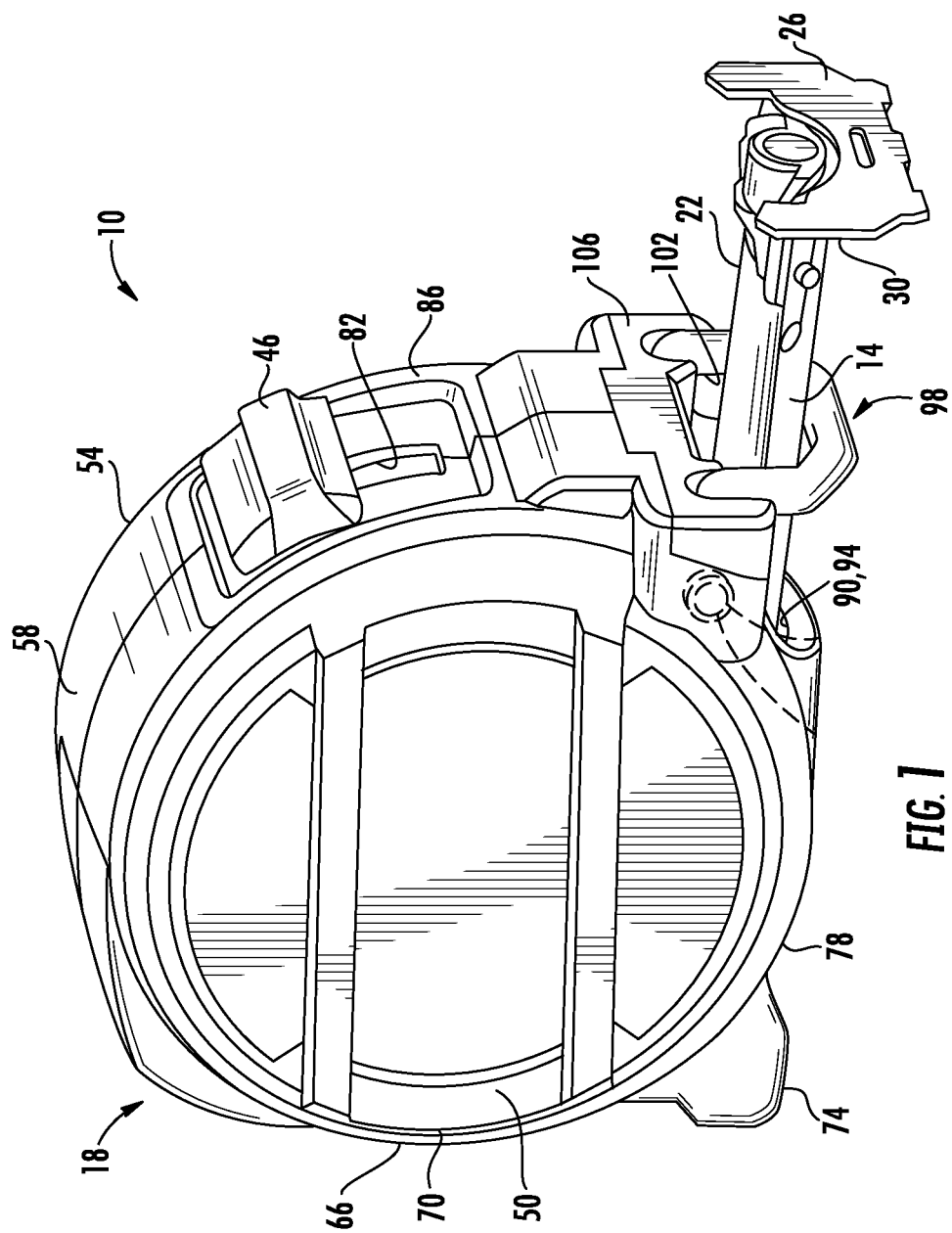
FIG. 1 is a left side perspective view of a tape measure, according to an exemplary embodiment.
Figure 2:
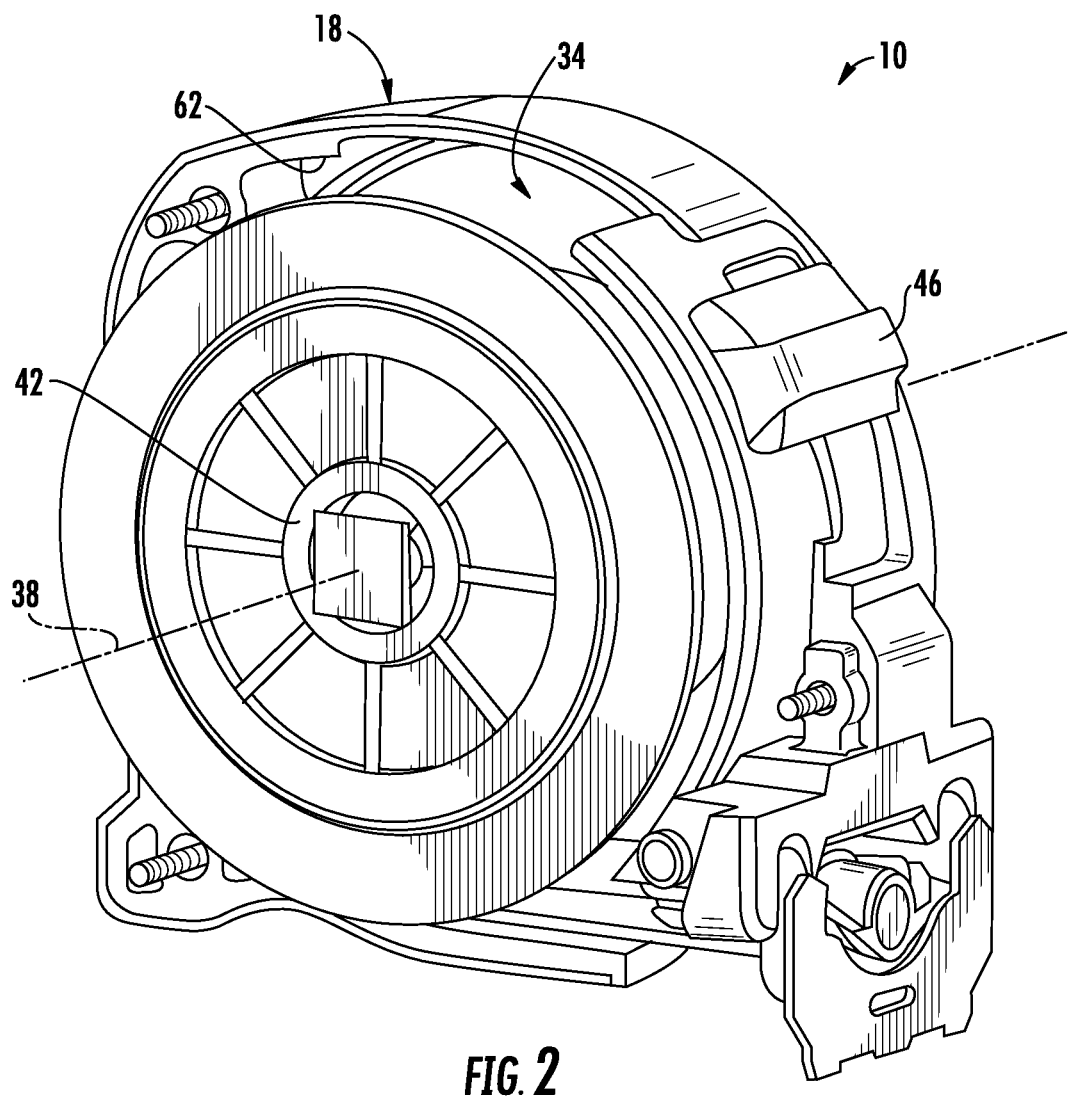
FIG. 2 is a left side perspective view of the tape measure of FIG. 1 with a portion of the tape measure housing removed, according to an exemplary embodiment.
Figure 3:
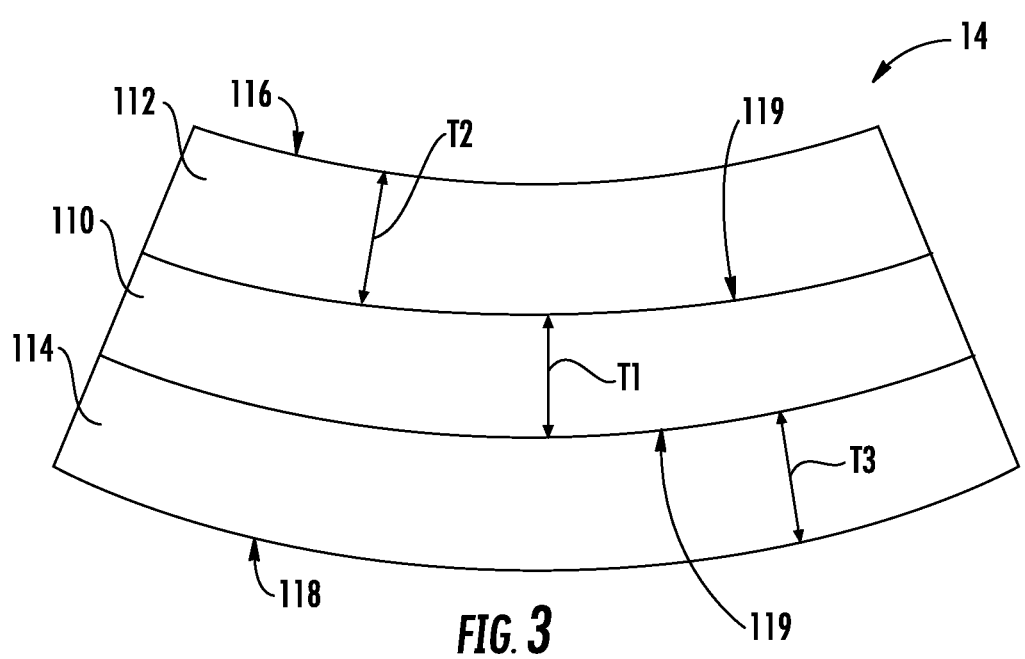
FIG. 3 is a cross-sectional view of a reinforced tape blade of the tape measure of FIG. 1, according to an exemplary embodiment.

Referring generally to FIGS. 1-3, various embodiments of a tape measure are shown and described. Various embodiments of the tape measure discussed herein include an innovative coated or laminated metal blade for a tape measure. Specifically, the tape measure blade discussed herein includes a relatively thick layer of material (e.g., a polymer material) coupled to upper and/or lower surfaces of an inner metal layer of the tape blade. The thickness, hardness, elasticity, and/or material type, etc. of the polymer reinforcement layer is selected to provide a tape measure blade having improved crack or break resistance as compared to tape measure blades having other layer thicknesses or other reinforcement materials.

In particular, Applicant has found that by forming a tape blade where the total thickness of the polymer reinforcement layer material (e.g., the combined thickness of both the upper and lower layers of polymer reinforcement layer material) is greater than the thickness of the inner metal layer provides a tape blade particularly resistant to breakage (e.g., as tested utilizing a pinch test described below). Without being bound by a particular theory, in at least some embodiments, Applicant hypothesizes that the thick reinforcement layer discussed herein limits the radius of curvature that the metal material of the tape blade is exposed to when crimped/bent and thereby reduces the risk that metal material will crack. In this state, Applicant's theorize that the pinch force required to crack the tape is the force required to compress the polymer reinforcement layer such that the bend radius of the steel inner layer decreases to the point at which cracks develop. Further, in at least some embodiments, Applicant hypothesizes that the thick reinforcement layer discussed herein acts to hold the metal material together in the event of small crack formation, which limits crack propagation and tape blade breakage.

In general, Applicant understands that the art has typically viewed increasing the size of the tape measure housing as undesirable due to the difficulty gripping, holding, transporting, etc., a large sized tape measure. For at least this reason, Applicant understands that the art has typically not seen increasing tape blade reinforcement layer thickness as a viable means for strengthening the tape blade due to the increased size of such blades when wound onto a reel within a tape measure housing. Accordingly, at least in some embodiments, the reinforced tape blade discussed herein is used in conjunction with one or more other components designed to reduce the size of other internal components located within the tape measure housing, which in turn allows more of the space within the tape measure housing to be occupied by the thickly coated, reinforced tape measure blade for a given outer housing size dimension.

In specific embodiments, the tape measure may include two or more small diameter coil springs (e.g., power springs) as part of the tape blade retraction system, which in turn allows the size of the outer diameter of the housing to be reduced, as compared to a similar tape measure using one large coil spring for retraction. Similarly, in specific embodiments, the tape measure may include a reduction gear train that allows for a smaller diameter, more energy dense spring as compared to a similar tape measure using a coil spring with no gear train for retraction.

In further specific embodiments, the tape blade has a length suitable for retraction via a spring based retraction system. In specific embodiments, the length of the tape blade is less than 50 feet or more, specifically less than 40 feet. In specific embodiments, the length of the tape blade is 35 ft., 30 ft., 25 ft., or 16 ft. In further specific embodiments, the tape blade has a curved cross-sectional shape. In such embodiments, the tape blade that has a shape in which the upper surface is a concave curved surface and the lower surface of the blade is a convex curved surface. In further specific embodiments, the tape blade is structured to have a relatively significant stand-out length (i.e., the length of tape blade that can extend from the housing while supporting itself without buckling), and in some such embodiments, the tape stand out is at least 1 foot, at least 3 feet, at least 6 feet, less than 10 feet, etc. Applicant believes these structures differentiate the tape measure of the present disclosure from very long (e.g., 100 ft. or more) crank-retracted tape measures.

Referring to FIG. 1 and FIG. 2, a length measurement device, such as tape measure 10, is shown according to an exemplary embodiment. Tape measure 10 includes an elongated tape blade, shown as coilable tape blade 14, and a housing 18. In general, tape blade 14 is an elongate strip of material including a plurality of graduated measurement markings (see e.g., FIG. 4), and in specific embodiments, tape blade 14 is an elongate strip of metal material (e.g., steel material) that includes an outer most end coupled to a hook assembly, shown as hook assembly 26. As discussed in more detail below, tape blade 14 may include various polymer layers or reinforcing layers (e.g., polymer coating layers, laminated polymer layers, adhesive applied films, etc.) to help protect tape blade 14 from cracking during whip or pinch. Further, tape blade 14 may include any combination of tape blade features of the various embodiments discussed herein.

As shown in FIG. 1, a variable-length extended segment 22 of the tape blade 14 is retractable and extendable from the housing 18. A hook assembly 26 is fixedly coupled to an outer end portion 30 of tape blade 14.

As shown in FIG. 2, the non-extended portion of tape blade 14 is wound onto a reel 34, which is surrounded by housing 18. Reel 34 is rotatably disposed about an axis 38 of tape measure 10, and a retraction mechanism 42 is coupled to reel 34 and configured to drive reel 34 about rotation axis 38 which in turn provides powered retraction of tape blade 14. Retraction mechanism 42 may include one or more elongated spiral springs that provide the retraction energy to retraction mechanism 42. In another embodiment, retraction mechanism 42 includes an electric motor in place of or in combination with a spring. A tape lock 46 is provided to selectively engage tape blade 14, which acts to restrain retraction mechanism 42 such that extended segment 22 of tape blade 14 remains at a desired length.

In specific embodiments, retraction mechanism 42 is configured to provide for a relatively small housing size, despite the increased blade thickness. In one embodiment, retraction mechanism 42 includes two or more spiral springs (e.g., power springs) which will deliver a desired level of torque while decreasing the outer diameter of the space occupied by the springs (at least as compared to the outer diameter of a single spiral spring that delivers the same level of torque). In other embodiments, retraction mechanism 42 includes a reduction gear train located between the tape reel and spring such that each rotation of the tape reel results in less than one rotation of the spring. This arrangement allows for a smaller diameter, more energy dense spring as compared to a similar tape measure using a coil spring with no gear train for retraction.

By utilizing one or more size reduction mechanisms, e.g., gearing, multiple springs, etc., a thicker tape blade may be used without the size of the housing growing for the same length of tape. In some embodiments, a coil spring having a width wider than the width of tape blade 14 may be used, which allows for a lower diameter/height spring to be used. In some such embodiments, the coil spring has a width between 110% and 150% of the width tape blade 14, specifically, the coil spring has a width between 120% and 135% of the width tape blade 14, and more specifically, the coil spring has a width of approximately 130% of the width tape blade 14. In this way, the spring may be of a smaller height, allowing reduction of the height of the housing relative to smaller-width, but larger diameter spring, which may allow for a smaller height housing with a thicker tape.

Referring to FIG. 1, housing 18 includes a first side wall 50, a second side wall 54, and a peripheral wall 58 connecting first side wall 50 and second side wall 54. First side wall 50, second side wall 54, and peripheral wall 58 define an internal cavity 62, shown in FIG. 2, in which reel 34 and retraction mechanism 42 are housed. Referring to FIG. 1, first side wall 50 and second side wall 54 have a substantially circular profile 66. In other embodiments, the side walls may be rectangular, polygonal, or any other desired shape. Portions of the housing 18 may be co-molded or separately formed of a resilient material, such as a natural or synthetic rubber. In the illustrated construction, housing 18 is formed with housing bumpers 70 and a support leg 74 which extend from a lower portion 78 of the peripheral wall 58.

A slot 82 is defined along a forward portion 86 of peripheral wall 58. Slot 82 provides an opening in the tape measure housing which allows tape lock 46 to extend into housing 18. In addition, slot 82 provides a length sufficient to allow tape lock 46 to be moved relative to housing 18 between locked and unlocked positions.

Below the slot 82, a tape port 90 is provided in peripheral wall 58. Tape port 90 has an arcuate shape 94, corresponding to an arcuate cross-sectional profile of tape blade 14. The tape port 90 allows for the retraction and extension of tape blade 14 to and from the internal cavity 62 defined within housing 18.

As shown in FIGS. 1 and 2, tape measure 10 includes a finger guard assembly 98. Finger guard assembly 98 includes a guard 102 and a guard support member 106. As shown in FIG. 1, the portions of guard 102 external to housing 18 are substantially U-shaped and extend downward from housing 18. As shown in FIG. 2, when tape 14 is in the retracted position, a rear surface of hook assembly 26 abuts guard 102.

Referring to FIG. 3, a cross-sectional view of tape blade 14 is shown. Tape blade 14 includes a core or inner layer 110 formed from a thin, elongate strip of metal material. In a specific embodiment, inner layer 110 is formed from a strip of steel material. In a specific embodiment, inner layer 110 has a thickness, T1, between 0.09 mm and 0.2 mm, specifically, between 0.1 mm and 0.18 mm (with up to a 25% thickness variation), and more specifically of 0.1 mm to 0.13 mm. In a specific embodiment, T1 is between 0.105 and 0.115 mm. In another specific embodiment, T1 is between 0.120 mm and 0.130 mm, and in another specific embodiment, T1 is between 0.10 mm and 0.11 mm. Inner layer 110 may be formed in a concavo-convex configuration (as shown in FIG. 3), which may provide for improved tape standout. Inner layer 110 may be an alloyed spring steel, alloyed high strength steel, etc. In one embodiment, the steel is of a hardness between 50-54 RHC (Rockwell hardness C). In another embodiment, the steel is of a hardness between 45-60 RHC.

In various embodiments, tape blade 14 includes at least one reinforcing layer coupled to at least one of the upper surface and/or lower surface of inner metal layer 110. In the specific embodiment shown in FIG. 3, tape blade 14 includes an upper reinforcing layer, shown as upper layer 112, coupled (e.g., attached, bonded, glued, etc.) onto the concave upper surface of inner metal layer 110 and a lower reinforcing layer, shown as lower layer 114, coupled (e.g., attached, bonded, glued, etc.) onto the convex lower surface of inner metal layer 110. In various embodiments, layers 112 and 114 are formed from a polymer material, and in a specific embodiment, are formed from a nylon material.

As shown, layer 112 has an upper surface 116 that defines the uppermost surface of tape blade 14, and layer 114 has a lower surface 118 that defines the lowermost surface of tape blade 14. Ink layers 119 may be located between layers 112 and/or 114 forming measurement markings or indicia (see FIG. 4). In specific embodiments, layers 112 and 114 are formed from a material that has a modulus of elasticity less than the modulus of elasticity of the metal material of inner layer 110. In specific embodiments, layers 112 and 114 are formed from a material that has a hardness less than the hardness of the metal material of inner layer 110. In specific embodiments, the coating layers discussed herein are formed from a nylon 12 material and/or a nylon 6/6 material.

In various embodiments, layers 112 and/or 114 are formed from an extruded polymer material and specifically an extruded nylon material. In such embodiments, the polymer for layers 112 and/or 114 are extruded in liquid form onto inner metal core 110, and cured or otherwise solidified to form layers 112 and/or 114.

In other embodiments, layers 112 and/or 114 are formed from a sheet of film material adhered to inner metal core 110. In various embodiments, layers 112 and/or 114 are formed from a sheet of polymer material that is bonded to the surfaces of inner metal core 110 using an adhesive material. In various embodiments, the sheet of polymer material is formed from a thermoplastic material, such as PET, and the adhesive may be an acrylic adhesive or a polyester thermoset adhesive.

In specific embodiments, layers 112 and/or 114 are formed from sheet of Mylar A material from DuPont and the adhesive is a polyester thermoset available from Bostik, Inc., and prototypes 4 and 5 shown in Table 1 (below) utilize such materials for layers 112 and/or 114. In addition to the pinch testing, Applicant has found that these materials result in layers 112 and 114 with high bonding such that these layers tear before delaminating.

In other specific embodiments, layers 112 and/or 114 are formed from 8412 Tape, which is a PET film with acrylic adhesive, available from The 3M Company, and prototypes 6 and 7 shown in Table 1 utilize these materials for layers 112 and/or 114. It should be understood that while FIG. 3 shows a tape blade with reinforcement layers on both the upper and lower surfaces of inner metal core 110, the various reinforcement layer designs, thicknesses, pinch test performances, etc. may be accomplished via a reinforcement layer meeting one or more of the design parameters discussed herein located on only one side of inner metal core 110.

As shown in FIG. 3, in specific embodiments, layers 112 and/or 114 do not wrap around the side edges of inner metal core 110. In fact, in testing versions of layers 112 and/or 114 that utilize adhesive-bonded film material, Applicant has found that edge wrapping increases the chance of delamination of layers 112 and/or 114 during pinch testing, but that delamination does not occur without edge wrapping. In some designs coverage of the edges of inner metal core 110 may be desirable. In such embodiments, an extruded polymer that forms layers 112 and/or 114 also covers the edge surfaces. In some embodiments utilizing laminated film for layers 112 and/or 114, a separate, narrow sheet of film material may be applied to cover each of the edge surfaces of inner metal core 110.

As shown in FIG. 3, layer 112 has a thickness, T2, and layer 114 has a thickness, T3. In specific embodiments, the total thickness of the tape blade reinforcement layer(s) (i.e., the combined thickness of layers 112 and 114, T2+T3) is greater than T1. In specific embodiments, T2+T3 is greater than 1.5T1. In specific embodiments, T2+T3 is between 1.5T1 and 3.5T1, and in even more specific embodiments, T2+T3 is between 1.5T1 and 2.5T1. Applicant has found that the substantial thickness of layers 112 and 114 relative to the thickness of core layer 110 limits the radius of curvature experienced by layer 110 during pinch tests (see Pinch Test description below), which in turn limits the likelihood that layer 110 will crack when pinched or crimped.

In specific embodiments, T2+T3 is between 0.2 mm and 0.4 mm. In a specific embodiment, T2+T3 is between 0.2 mm and 0.25 mm, and more specifically is between 0.21 mm and 0.23 mm. In one embodiment, T2 is substantially equal to T3 (e.g., is within 5% of T3). In another embodiment, T2 is greater than T3 (e.g., is more than 5% greater than T3). In another embodiment, T3 is greater than T2 (e.g., is more than 5% greater than T2).

In other embodiments, the reinforcement layer thickness can be expressed as the ratio of total tape blade thickness (T1+T2+T3) to the thickness of inner metal core 110 (T1). In various embodiments. (T1+T2+T3)/T1 is greater than or equal to 2, and specifically greater than or equal to 2.5. In more specific embodiments, (T1+T2+T3)/T1 is between 2.5 and 4, and more specifically between 2.5 and 3.5.

In one embodiment, the total tape blade thickness (inclusive of all of the reinforcement layers and the core layer, i.e., T1+T2+T3) is between 0.3 mm and 0.5 mm. In a specific embodiment, T1+T2+T3 is between 0.3 mm and 0.35 mm, and specifically is 0.33 mm (e.g., 0.33 mm plus or minus 5%). As shown in Table 1 below, prototype 1 has a total thickness of 0.33 mm and a pinch load threshold of greater than 30 lbs. In particular embodiments, Applicant believes that this design represents a particularly advantageous balance between strength enhancing tape blade thickness without unduly increasing tape housing size or manufacturing costs.

In one embodiment, one or more reinforcing layers, such as layers 112 and 114, are applied over the entire length of inner layer 110.

In one embodiment, one or more reinforcing layers, such as layers 112 and 114, are applied over at least 6 feet of the length of inner layer 110, specifically over at least 8 feet of the length of inner layer 110, and more specifically over at least 10 feet of the length of inner layer 110. In specific embodiments, these lengths are contiguous lengths of the material forming layers 112 and 114. Such designs may provide increased tear resistance in areas of the tape blade 14 prone to increased wear, while maintaining compactness of the tape relative to a tape blade that has the coating over the entire length. In one embodiment, layers 112 and 114 begin at the end of the tape blade 14 proximate the hook. In another embodiment, the reinforcement layer starts at a location of the blade spaced apart from the end proximate hook assembly 26.

In some embodiments, layers 112 and/or 114 do not have uniform thicknesses along the width and/or length of tape blade 14. In some such embodiments, layers 112 and/or 114 may be applied in a pattern (e.g., a honeycomb pattern, a checkered pattern, etc.) where there are portions of thicker and thinner coating distribution across both the length and width of the tape blade 14. In such embodiments, T2 and T3 shown in FIG. 3 represent the thickness measured through the thickest portion of the coating pattern. In some such embodiments, the ranges of T2 and T3 discussed herein represent the maximum thickness of layers 112 and 114 at any portion along the length of tape blade 14. For example, in some such embodiments, the combined maximum coating and blade thickness may be 0.33 mm, but in other areas along the length and width of the tape blade, the coating and blade thickness will be less (e.g., as measured at the thinner coating portions of the coating pattern). In other embodiments, the ranges of T2 and T3 discussed herein represent the average thickness of layers 112 and 114 measured at all of the thickest portions of the coating pattern along the length and width of tape blade 14.

One or more reinforcing layers, such as layers 112 and 114, may be applied as a laminate, nylon extrusion, film attached with adhesive, power/spray on coating. In one embodiment, the reinforcement layer(s) are configured such that even if the steel core were to fracture, the reinforcement layer is configured to contain the steel core and to maintain the integrity of the blade (e.g., the reinforcement layer will tend not to tear).

As will be discussed in more detail below, layers 112 and 114 are designed to provide high levels of pinch test performance, represented by a pinch load threshold (which is the pinch test force required to break a given tape blade) and a pinch height at break. In various embodiments, tape blade 14 has a pinch load threshold greater than or equal to 30 lbs., and specifically a pinch load threshold greater than 30 lbs. and less than 50 lbs. In a specific embodiment, the pinch load threshold is greater than 30 lbs. and less than 35 lbs. In various embodiments, tape blade 14 has a pinch height at break of less than 1.5 mm.

Pinch Test and Examples

Testing data for a number of tape measure blades designs having different total thicknesses, reinforcement layer thicknesses and reinforcement layer types are shown in Table 1, below. As shown in Table 1, the prototype designs are specific exemplary embodiments of innovative tape blades with reinforcing layers designed as discussed herein. The other data sets show testing of current commercially available tape measures. As can be seen, the various prototype designs perform significantly better during pinch test than the prior art designs, while having higher overall tape thickness (resulting from thicker reinforcing layers) but lower steel thicknesses. From this testing Applicant has concluded that significantly better pinch test performance can be achieved via increases in reinforcing layer thickness while decreasing steel thickness. In addition, Applicant has determined that designing a tape blade in which the pinch load threshold is greater than 30 lbs., and specifically between 30 lbs. and 50 lbs. provides a desirable balance between high enough pinch test performance while maintaining a satisfactorily low overall tape blade thickness.

TABLE 1

| Name | Reinforcement Layer Type | Tape Width (mm) | Steel Thickness (T1) (mm) | Total Tape Thickness (T1 + T2 + T3) (mm) | Ratio of Total Thickness to Steel Thickness | Hardness (HV0.5) | Pinch Height at break (mm) | Load at break (lb) |
|---|---|---|---|---|---|---|---|---|
| Prototype 1 - Test 1 | Nylon Extrusion | 27 | 0.11 | 0.33 | 3.00 | 510 | 1.28 | 35 |
| Prototype 1 - Test 2 | Nylon Extrusion | 27 | 0.11 | 0.33 | 3.00 | 510 | 1.3 | 38 |
| Prototype 1 - Test 3 | Nylon Extrusion | 27 | 0.11 | 0.33 | 3.00 | 510 | 1.26 | 33 |
| Prototype 2 - Test 1 | Nylon Extrusion | | 0.13 | 0.40 | 3.08 | 490 | 0.81 | 62.6 |
| Prototype 2 - Test 2 | Nylon Extrusion | | 0.13 | 0.40 | 3.08 | 490 | 0.81 | 63.0 |
| Prototype 2 - Test 3 | Nylon Extrusion | | 0.13 | 0.40 | 3.08 | 490 | 0.78 | 79.5 |
| Prototype 3 - Test 1 | Nylon Extrusion | | 0.13 | 0.50 | 3.85 | 500 | 0.88 | 150.1 |
| Prototype 3 - Test 2 | Nylon Extrusion | | 0.13 | 0.50 | 3.85 | 500 | 0.88 | 150.1 |
| Prototype 3 - Test 3 | Nylon Extrusion | | 0.13 | 0.50 | 3.85 | 500 | 0.90 | 150.1 |
| Prior Art 1 - Test 1 | Film | 29 | 0.13 | 0.16 | 1.25 | | 1.723 | 22.5 |
| Prior Art 1 - Test 2 | Film | 29 | 0.13 | 0.16 | 1.25 | | 1.638 | 23.1 |
| Prior Art 1 - Test 3 | Film | 29 | 0.13 | 0.16 | 1.25 | | 1.595 | 24.9 |
| Prior Art 2 - Test 1 | Film | 32 | 0.13 | 0.18 | 1.38 | | 2.360 | 23.2 |
| Prior Art 2 - Test 2 | Film | 32 | 0.13 | 0.18 | 1.38 | | 2.309 | 23.4 |
| Prior Art 2 - Test 3 | Film | 32 | 0.13 | 0.18 | 1.38 | | 2.309 | 23.7 |
| Prior Art 2 - Test 4 | Film | 32 | 0.13 | 0.18 | 1.38 | | 2.352 | 25.0 |
| Prior Art 2 - Test 5 | Film | 32 | 0.13 | 0.18 | 1.38 | | 2.267 | 25.2 |
| Prior Art 2 - Test 6 | Film | 32 | 0.13 | 0.18 | 1.38 | | 2.394 | 25.3 |
| Prior Art 3 - Test 1 | Film | 32 | 0.13 | 0.18 | 1.42 | | 2.188 | 25.0 |
| Prior Art 3 - Test 2 | Film | 32 | 0.13 | 0.18 | 1.42 | | 2.231 | 25.3 |
| Prior Art 3 - Test 3 | Film | 32 | 0.13 | 0.18 | 1.42 | | 2.231 | 25.3 |
| Prior Art 3 - Test 4 | Film | 32 | 0.13 | 0.18 | 1.42 | | 2.188 | 25.6 |
| Prior Art 3 - Test 5 | Film | 32 | 0.13 | 0.18 | 1.42 | | 2.019 | 25.7 |
| Prior Art 3 - Test 6 | Film | 32 | 0.13 | 0.18 | 1.42 | | 2.104 | 25.8 |
| Prior Art 3 - Test 7 | Film | 32 | 0.13 | 0.18 | 1.42 | | 2.019 | 25.8 |
| Prior Art 3 - Test 7 | Film | 32 | 0.13 | 0.18 | 1.42 | | 2.315 | 25.9 |
| Prior Art 4 - Test 1 | Film | 29 | 0.13 | 0.16 | 1.25 | | 1.469 | 26.0 |
| Prior Art 3 - Test 9 | Film | 32 | 0.13 | 0.18 | 1.42 | | 2.188 | 26.3 |
| Milwaukee 48-22-7116 Test 1 | Nylon Extrusion | 27 | 0.13 | 0.19 | 1.48 | | 1.759 | 27.0 |
| Milwaukee 48-22-7116 Test 2 | Nylon Extrusion | 27 | 0.13 | 0.19 | 1.48 | | 1.759 | 27.2 |
| Milwaukee 48-22-7116 Test 3 | Nylon Extrusion | 27 | 0.13 | 0.19 | 1.48 | | 1.770 | 27.5 |
| Prior Art 3 - Test 10 | Film | 32 | 0.13 | 0.18 | 1.42 | | 2.358 | 27.3 |
| Prior Art 3 - Test 11 | Film | 32 | 0.13 | 0.18 | 1.42 | | 2.358 | 27.4 |
| Prior Art 3 - Test 12 | Film | 32 | 0.13 | 0.184 | 1.42 | | 2.146 | 27.7 |
| Prototype 4 - Test 1 | single sided film | 25 | 0.125 | 0.34 | 2.72 | 570 | | 27.7 |
| Prototype 4 - Test 2 | single sided film | 25 | 0.125 | 0.34 | 2.72 | 570 | | 27.7 |
| Prototype 5 - Test 1 | double sided film | 25 | 0.125 | 0.415 | 3.32 | 570 | | 49.3 |
| Prototype 5 - Test 2 | double sided film | 25 | 0.125 | 0.415 | 3.32 | 570 | | 45.0 |
| Prototype 6 - Test 1 | single sided film | 25 | 0.106 | 0.304 | 2.87 | 504 | 0.40 | 41.7 |
| Prototype 6 - Test 2 | single sided film | 25 | 0.106 | 0.304 | 2.87 | 504 | 0.40 | 41.9 |
| Prototype 7 - Test 1 | double sided film | 25 | 0.106 | 0.464 | 4.38 | 504 | 0.40 | 150.1 |
| Prototype 7 - Test 2 | double sided film | 25 | 0.106 | 0.464 | 4.38 | 504 | 0.40 | 172.1 |

Figure 4:
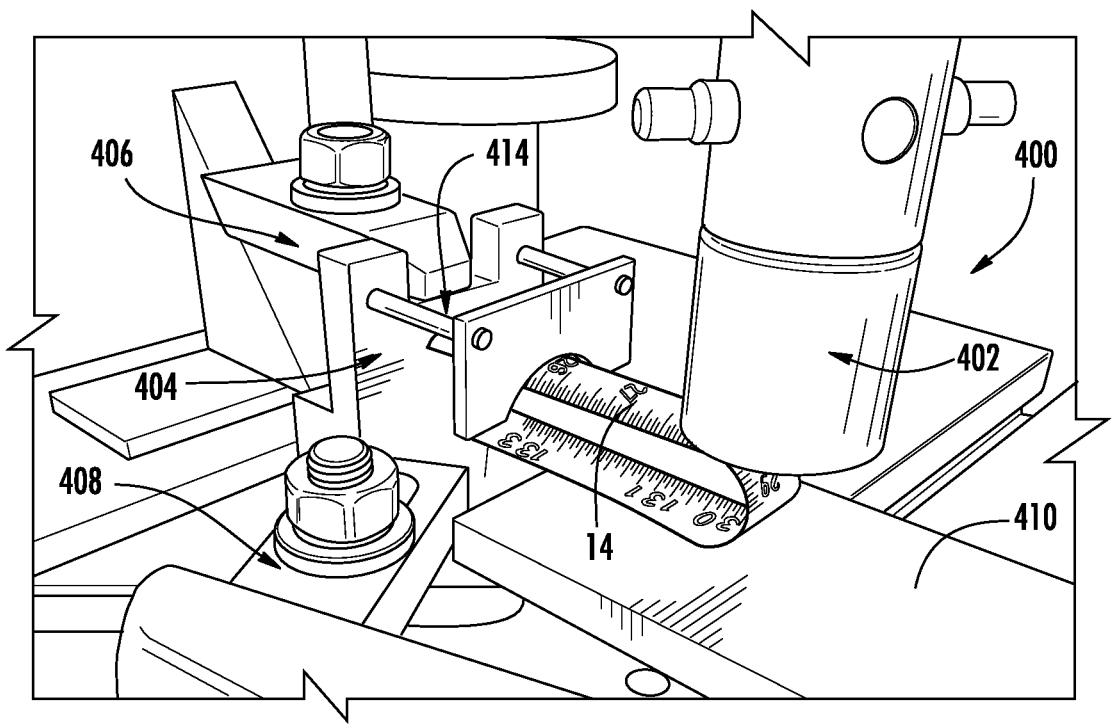
FIG. 4 is a photograph showing the set up for the tape blade pinch test, as discussed below.
Figure 5:
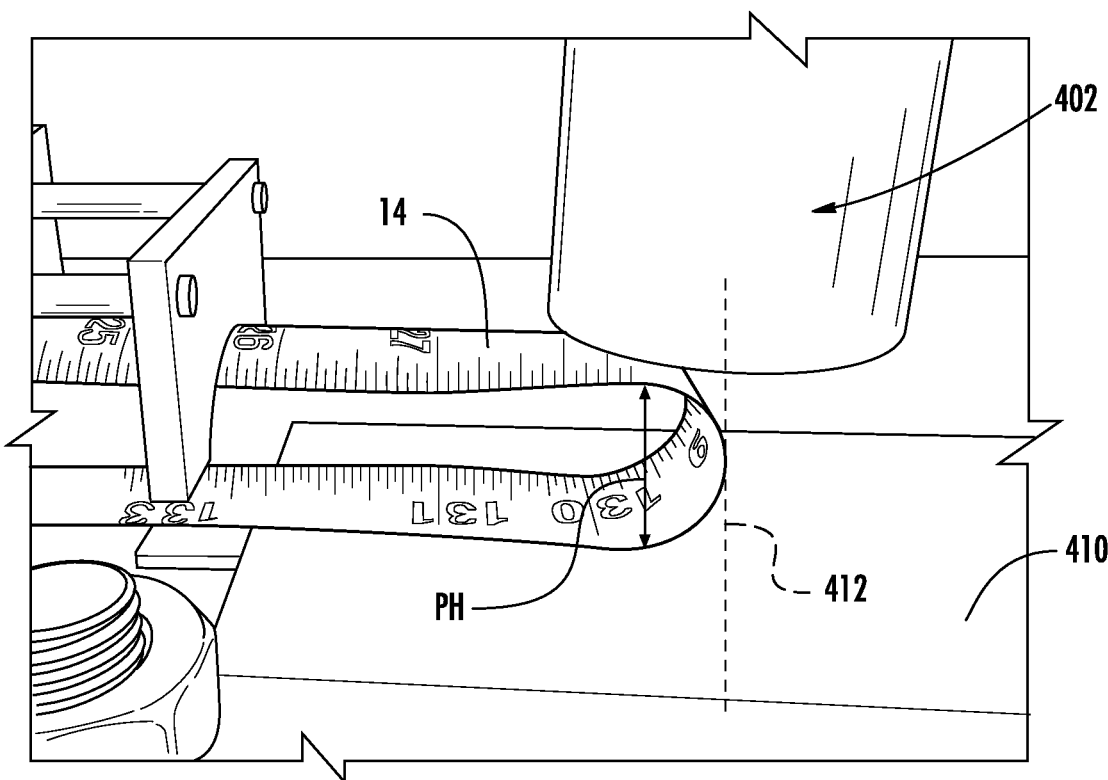
FIG. 5 is a photograph showing engagement between a mandrel and a tape blade during a pinch test, as discussed below.
Figure 6:
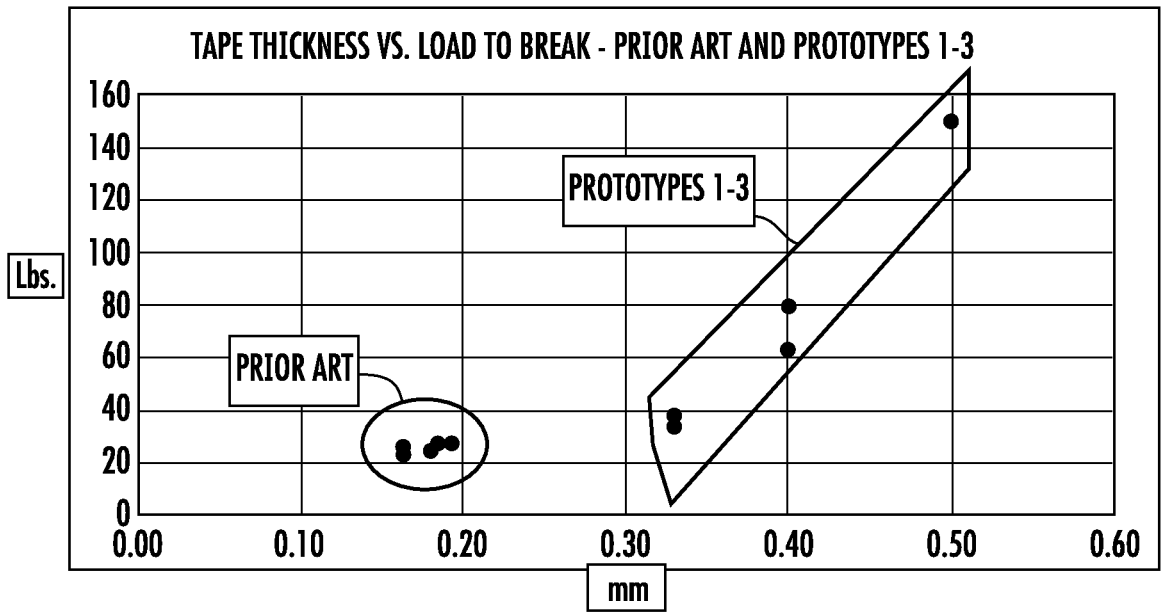
FIGS. 6-9 show various graphs of the data from Table 1 below.
Figure 7:
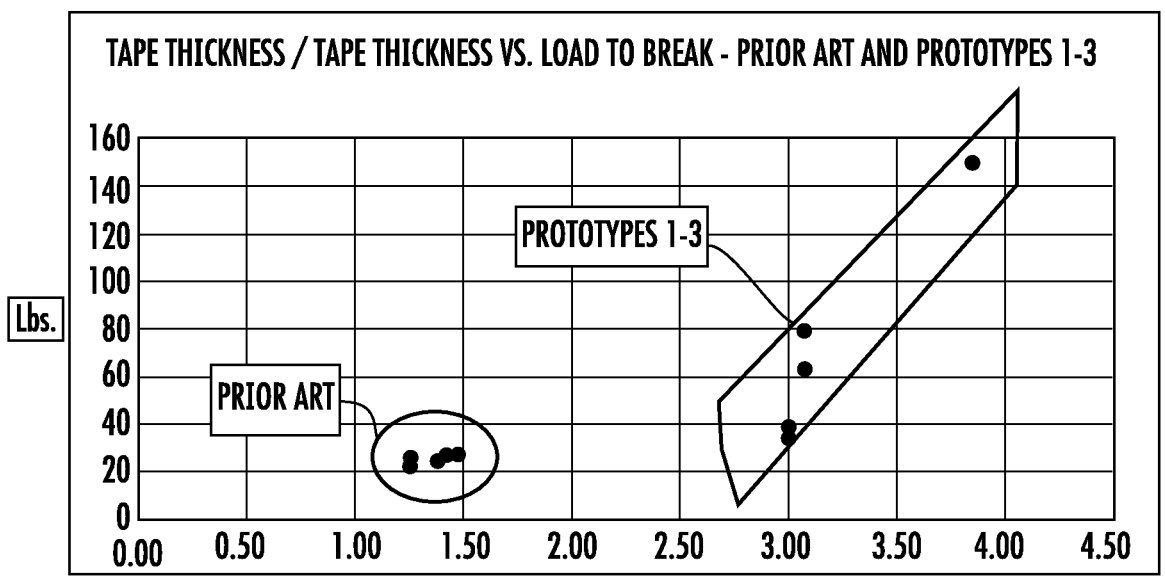
Figure 8:
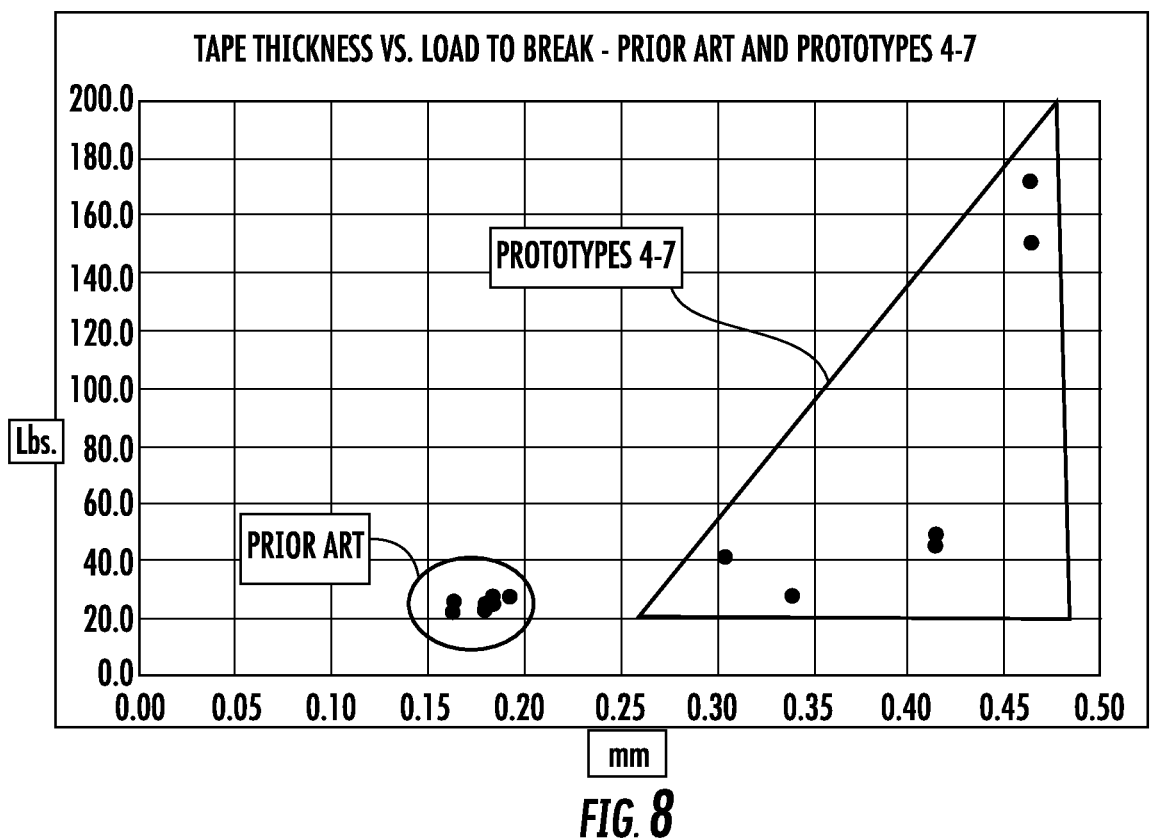
Figure 9:
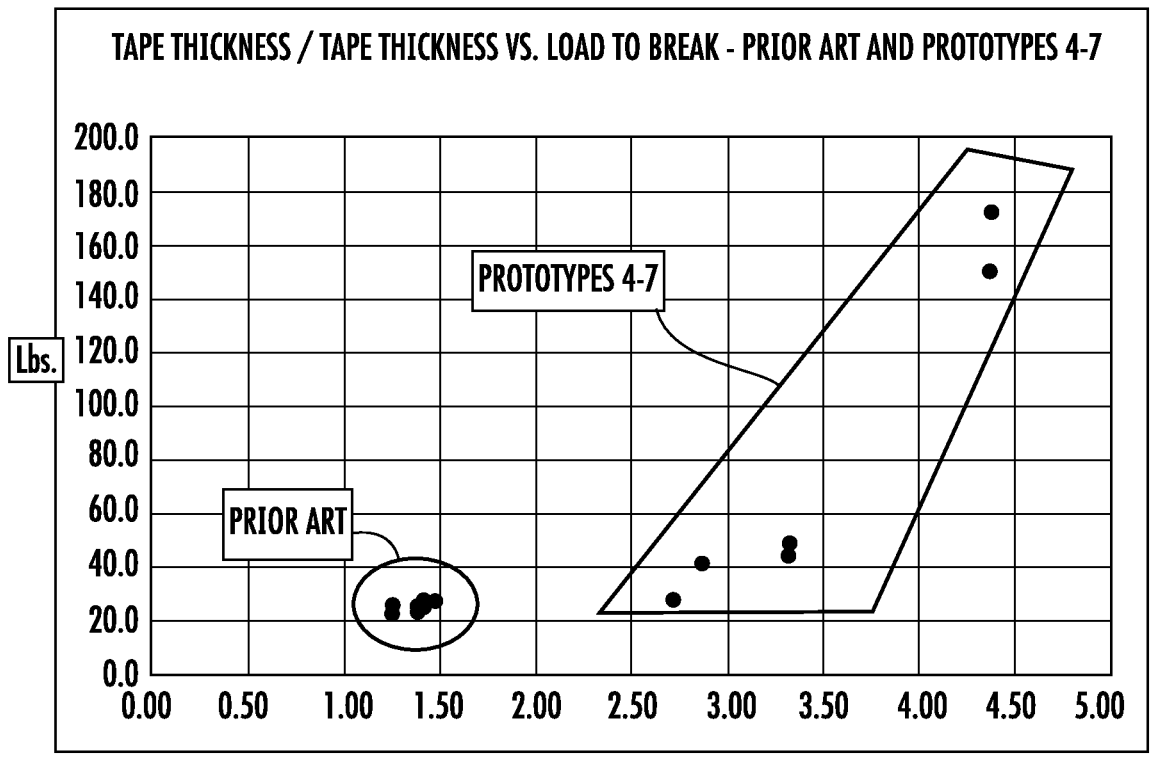

Referring to FIGS. 4 and 5, details of the Pinch Test used to generate the data shown in Table 1, is shown and described. Pinch test system 400 includes a mandrel 402, a test fixture 404, clamp assemblies 406 and 408, and an aluminum support plate 410. Test fixture 404 supports a tape blade 14 that is to be pinch tested. Test fixture 404 holds tape blade in the u-shape as shown in FIG. 5. Clamp assembly 406 secures tape blade 14 to test fixture 404, and clamp assembly 408 secures test fixture 404 to a testing table. During pinch testing a 10 inch long piece of tape 14 is used. Mandrel 402 is run by an Instron Tensile Machine. Test fixture 404 is a component as shown for holding tape blade 14, and plate 410 is an 8 inch×4 inch×0.5 inch piece of extruded aluminum.

To set up the pinch test, test fixture 404 is positioned so that the u-bend in tape blade 14 is located near the vertical central axis 412 of mandrel 402, as shown in FIG. 5. Next, tape blade 14 is removed to continue setup. Next, the position of mandrel 402 is located, and the maximum displacement value is set. Specifically, mandrel 402 is lowered so that it is touching the upper surface of plate 410. At this point, mandrel extension value is set to zero. Next, the mandrel 402 is raised away from plate 410 to a height of 0.156 inches (~2×thickness of tape blade 14 being tested). At this point, the mandrel extension value is set to zero again. Next, mandrel 402 is raised to a height of about ~1.5 inches above plate 410, and the exact mandrel extension value is recorded and is set as the maximum displacement used during the pinch test. Then the mandrel extension value is set to zero again.

During pinch testing, the machine running mandrel 402 advances mandrel 402 at a rate of 1 inch per minute, and is set to stop if the load exceeds 150 lbs. Tape blade 14 is returned to its position below mandrel 402 as shown in FIG. 4, and the ends 414 of tape blade 14 are positioned flush against the back wall of test fixture 404. Next, the test is started causing mandrel 402 to advance, controlled by the Instron Machine, which pinches tape blade 14 against plate 410. As shown in FIG. 5, the computer running the mandrel 402 tracks mandrel displacement, from which pinch height, PH, shown in FIG. 5, is calculated. This is run until tape 14 fails or the maximum displacement or load is reached.

FIGS. 6-9 show plots of the data shown in Table 1. As can be seen, with the exception of prototype 4, the prototypes utilizing the thicker reinforcement layers discussed herein perform significantly better than the prior art tape measures utilizing the pinch testing discussed herein. Based on these tests, Applicant theorizes that the relationship between thickness and load at break is exponential (or similar). At a point along the curve, when the blade is bent over on itself, the thickness of the reinforcement layer is sufficient to cause the steel to have a radius that is large enough not to easily snap the steel. At that point, the force to break is essentially the force necessary to squish the polymer of the reinforcement layer through the radiused steel. That is the point where the trend line increases dramatically.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A tape measure comprising:
    a housing;
    a reel rotatably mounted within the housing;
    an elongate blade wound around the reel, the elongate blade comprising:
        an elongate metal core having an upper surface, a lower surface and a first thickness, T1, measured between the upper surface and the lower surface, wherein the upper surface includes a concave curved section and the lower surface includes a convex curved section;
        an upper reinforcement layer coupled to and covering at least a portion of the upper surface of the elongate metal core, the upper reinforcement layer having a second thickness, T2, and an upper surface defining the uppermost surface of the elongate blade;
        a lower reinforcement layer coupled to and covering at least a portion of the lower surface of the elongate metal core, the lower reinforcement layer having a third thickness, T3, and a lower surface defining the lowermost surface of the elongate blade; and
        an ink layer located between the upper surface of the elongate metal core and the upper reinforcement layer forming a series of measurement markings;
        wherein $T2+T3 \geq 1.5 \times T1$;
        wherein the elongate blade has a pinch load threshold of greater than 30 lbs;
    a retraction mechanism coupled to the reel and configured to driving rewinding of the elongate blade on to the reel; and
    a hook assembly coupled to an outer end of the elongate blade.

2. The tape measure of claim 1, wherein T1 is 0.1 mm to 0.13 mm, and T2+T3 is between 0.2 mm and 0.4 mm.

3. The tape measure of claim 1, wherein T1 is an average thickness of the elongate metal core, and T2 and T3 are the maximum thicknesses of the upper and lower reinforcement layer.

4. The tape measure of claim 1, wherein the upper reinforcement layer is located along at least 6 ft. of the length of the elongate metal core, wherein the lower reinforcement layer is located along at least 6 ft. of the length of the elongate metal core.

5. The tape measure of claim 4, wherein the upper reinforcement layer and the lower reinforcement layer are located along an entire length of the elongate metal core.

6. The tape measure of claim 1, wherein the elongate metal core comprises a steel material having a hardness of 45-60 RHC, and the upper and lower reinforcement layers comprise at least one of an extruded nylon and a laminated film.

7. The tape measure of claim 1, wherein the elongate blade has a length less than 50 feet.

8. The tape measure of claim 1, wherein the elongate blade has a pinch height at break of less than 1.5 mm.

9. The tape measure of claim 1, wherein the elongate blade has a pinch load threshold of less than 50 lbs, wherein the retraction mechanism comprises a spring coupled to the reel such that when the elongate blade is unwound from the reel to extend from the housing the spring stores energy and the spring release energy driving rewinding of the elongate blade on to the reel.

10. A tape measure comprising:
a housing;
a reel rotatably mounted within the housing;
an elongate blade wound around the reel comprising:
    an elongate metal core having an upper surface, a lower surface and a metal thickness measured between the upper surface and the lower surface;
    a polymer reinforcement layer coupled to a surface of the elongate metal and extending contiguously lengthwise for at least 6 ft. along a length of the elongate metal core, the polymer reinforcement layer having a polymer reinforcement layer thickness;
    an ink layer located between the elongate metal core and the polymer reinforcement layer, the ink layer forming a series of measurement markings;
    wherein the elongate blade has a pinch load threshold of greater than 30 lbs and of less than 50 lbs;
a retraction mechanism coupled to the reel and configured to driving rewinding of the elongate blade on to the reel; and
a hook assembly coupled to an outer end of the elongate blade.

11. The tape measure of claim 10, wherein the elongate blade has a pinch height at break of less than 1.5 mm, wherein the polymer reinforcement thickness is between 0.2 mm and 0.4 mm and the metal thickness is between 0.1 mm and 0.13 mm.

12. The tape measure of claim 10, wherein the polymer reinforcement thickness is greater than or equal to 1.5 times the metal thickness.

13. The tape measure of claim 10, wherein the elongate metal core comprises a steel material having a hardness of 45-60 RHC, and the polymer reinforcement layer comprise at least one of an extruded nylon and a laminated film.

14. The tape measure of claim 10, wherein the polymer reinforcement layer comprises an upper portion coupled to the upper surface of the elongate blade and a lower portion coupled to the lower surface of the elongate blade.

15. The tape measure of claim 10, wherein the elongate blade has a length less than 50 feet.

16. The tape measure of claim 10, wherein the elongate blade has a pinch load threshold of less than 35 lbs.

17. A tape measure comprising:
a housing;
a reel rotatably mounted within the housing;
an elongate blade wound around the reel comprising:
    an elongate metal core having an upper surface, a lower surface and a metal thickness measured between the upper surface and the lower surface;
    a polymer reinforcement layer at least partially surrounding the elongate metal core when viewed in cross-section and extending contiguously lengthwise for at least 6 ft. along a length of the elongate metal core, the polymer reinforcement layer having a polymer reinforcement layer thickness;
    an ink layer located between the elongate metal core and the polymer reinforcement layer, the ink layer forming a series of measurement markings;
    wherein the polymer reinforcement layer thickness is greater than the metal thickness;
a retraction mechanism coupled to the reel and configured to driving rewinding of the elongate blade on to the reel; and
a hook assembly coupled to an outer end of the elongate blade;
wherein the polymer reinforcement layer comprises at least one of an extruded nylon layer and a laminate film.

18. The tape measure of claim 17, wherein the polymer reinforcement layer thickness is between 0.2 mm and 0.4 mm and the metal thickness is between 0.1 mm and 0.13 mm.

19. The tape measure of claim 18, wherein the polymer reinforcement layer thickness is an average thickness of the polymer reinforcement layer averaged along the length of the polymer reinforcement layer.

20. The tape measure of claim 17, wherein the elongate blade has a pinch height at break of less than 1.5 mm.

21. The tape measure of claim 17, wherein the elongate blade has a pinch load threshold of 30 lbs. to 50 lbs.

* * * * *